Oct. 9, 1928.  
J. BOLGIANO ET AL  
1,687,360
PROPELLING MEANS
Filed June 13, 1927   2 Sheets-Sheet 1
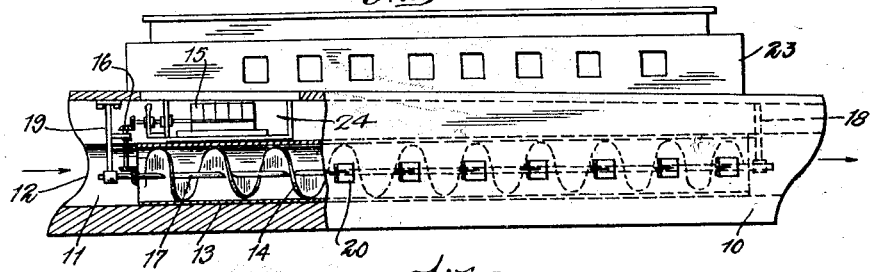
Fig. 1.
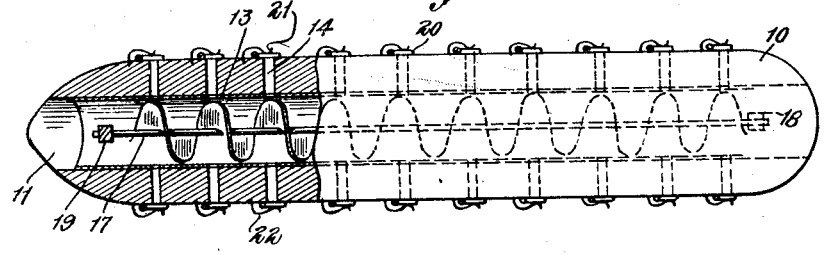
Fig. 2.
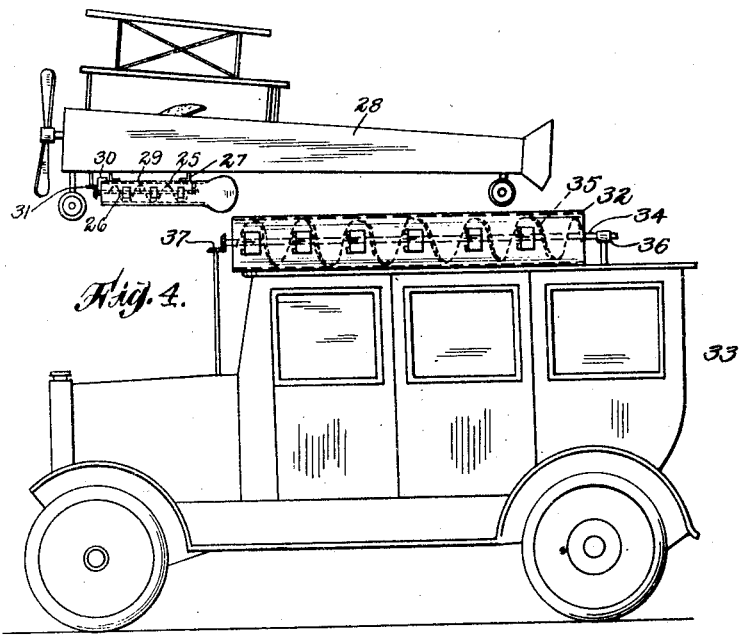
Fig. 3.
Fig. 4.
Inventors  
John Bolgiano  
William Reilly  
By their Attorney  
George C. Heinicke Oct. 9, 1928.  1,687,360

J. BOLGIANO ET AL

PROPELLING MEANS

Filed June 13, 1927   2 Sheets-Sheet 2

Inventors
John Bolgiano
William J. Reilly
By their Attorney
George C. Heinrich

Patented Oct. 9, 1928.

1,687,360

UNITED STATES PATENT OFFICE.

JOHN BOLGIANO, OF NEW YORK, AND WILLIAM REILLY, OF WHITE PLAINS, NEW YORK.

PROPELLING MEANS.

Application filed June 13, 1927. Serial No. 198,601.

The present invention relates to improvements in the means for propelling vessels as for instance described in abandoned application Serial No. 47,253, filed July 31, 1925, land vehicles such as automobiles or aircraft by making use of a device known as the Archimedean screw, and it is the principal object of our invention to build such a screw into the vessel, the automobile or aircraft equipped with a means for starting and continuing the revolution of the screw and thus propelling the vessel through the water, all kinds of vehicles along the roads and the aircraft through the air.

Another object of our invention is the provision of a novel and improved means for propelling vessels by the employ of an Archimedean screw and providing such vessels with improved and novel water exhaust means.

A further object of our invention is the provision of a propelling means for vehicles in the water, on land and in the air which is inexpensive, durable and extremely efficient in operation.

These and other objects and advantages of our invention will become more fully apparent as the description thereof proceeds, and will then be specifically defined in the appended claims.

In the accompanying drawings forming a material part of this disclosure:

Fig. 1 is a side elevation of a vessel, partly in section and equipped with a means of propulsion constructed according to our invention.

Fig. 2 is a top plan view thereof, partly in section.

Fig. 3 shows the use of our novel and improved propelling means in use with aircraft.

Fig. 4 illustrates the use of our novel propelling means for driving an automobile or other vehicle.

Figure 5:
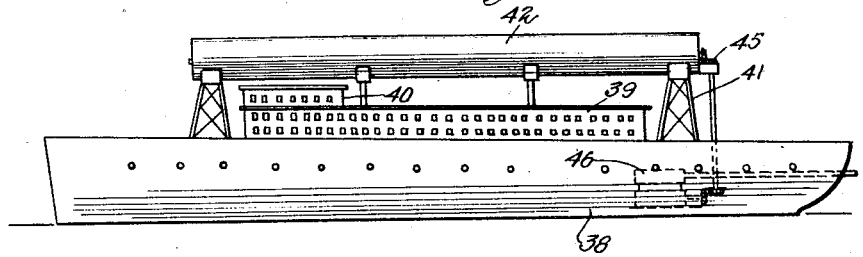
Fig. 5 is a side elevation of a modified form of construction of a vessel equipped with our improved propelling means.

As illustrated in Figures 1 and 2, the hull 10 of a vessel has a channel 11 built therein in the direction of its longitudinal axis, open at its front end, as at 12, and adapted for the reception of the cylindrical mantle or housing 13 of an Archimedean screw 14. The screw is started to revolve about its axle 17 by means of a suitable auxiliary motor 15 and a train of intermediate gears, generally designated 16, which can be uncoupled from the screw as soon as the vessel and the screw have acquired sufficient headway.

The shaft or axle 17 is revolved in suitable bearings suspended from the hangers 18 and 19 respectively in the rear and front parts of the vessel depending from a deck thereof.

The exhaust of the water after its use is effected by means of a plurality of orifices closed by valve plates 20 and, arranged to both sides of the vessel in the hull thereof connected with the median or main channel 11 by means of transverse channels or ducts 21, said plates are normally held closed by means of suitable springs 22 or the like closing the orifices and channels 21 communicating therewith.

The vessel is provided with the customary cabins 23, and the motor and other operating mechanism is installed in a suitable engine room 24 under the cabin near the forecastle of the vessel.

As illustrated in Figure 3, the housing 25 for the Archimedean screw 26 is supported by a framework 27 resting on the body of an aircraft 28, and the shaft 29 is projecting beyond the ends of the housing and is journalled in suitable bearings on brackets 30, while the rear end of the shaft 29 carries a suitable train of gears or gearing 31 adapted to be propelled by means of an auxiliary motor of any desired type for starting and continuing the revolution of shaft and screw. It will be clear that the Archimedean screw may also be suspended from the fuselage out of the way of the landing wheels or gear and other operating parts for the air-ship. It may also be installed in an airship using gas bags of the dirigible, or any other type.

In Figure 4 the housing 32 of the Archimedean screw is suitably supported or arranged on the top or roof of an automobile 33 or the like. The shaft 34 of the screw 35 projects beyond the ends of the housing and is journalled in suitable bearings 36 or the like and its rear end carries a suitable train of gears or gearing 37 adapted to be driven from an auxiliary motor aboard the car. It will be clear that the Archimedean screw may also be arranged otherwise than above described without interfering with the operating parts of the automobile.

Figure 6:
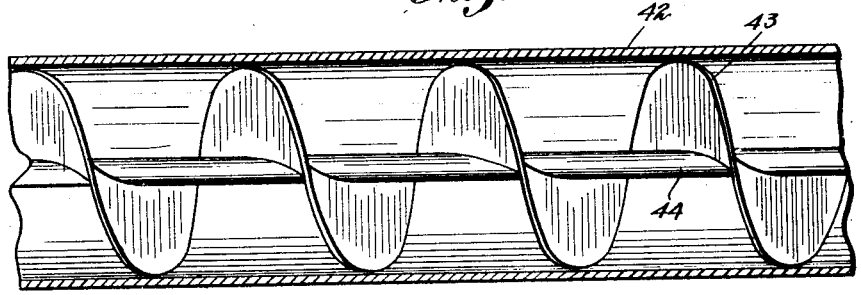
Fig. 6 is a longitudinal section through the housing of the Archimedean screw.
Figure 7:
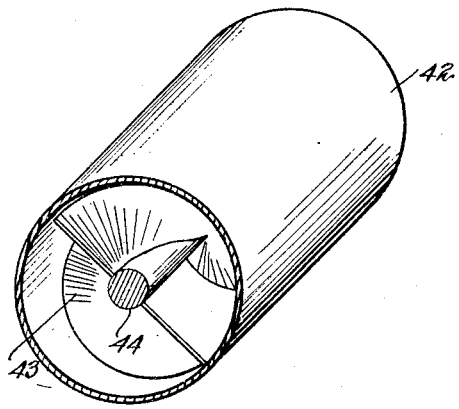
Fig. 7 is a fragmentary perspective view of the screw.
Figure 8:
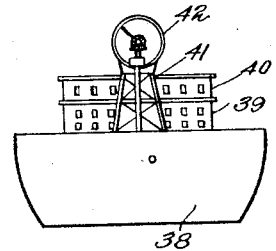
Fig. 8 is an end view of the vessel, Figure 5.

As illustrated in Figures 5, 6, 7 and 8, a modified form of our invention comprises a hull 38 of a vessel with the cabins 39 and 40; the decks of said vessel carry a plurality of frame posts or standards 41 supporting the cylindrical housing 42 of the Archimedean screw 43, the axle or shaft 44 of which extending parallel to the longitudinal axis of the vessel projects beyond the ends of the housing and is journalled in suitable bearings, and carries a gearing 45 or the like adapted to be operated by an auxiliary engine 46 of any suitable type.

It will be clear that any suitable mechanism may be employed to couple and uncouple the screw from the auxiliary starting engine, as well as any suitable well known braking devices may be employed to stop the screw, it is not deemed necessary to describe these mechanisms in detail, as their specific construction does not form part of the present invention.

It is to be understood, that we have described and illustrated as examples some of the forms for practically constructing our invention only, and that numerous changes in the general arrangement and in the construction of the minor details may be made within the scope of the appended claims without departure from our invention and the principle involved, so may for instance the number of gills be decreased or increased according to necessity and practical requirements or the location of the Archimedean screw may be changed in order to give the best practical results without departing from the spirit of our invention.

Having thus described our invention, what we claim as new, and desire to secure by Letters Patent is:

1. A propelling means for vessels by means of an Archimedean screw comprising a channel within the hull of the vessel extending in the direction of the longitudinal axis thereof, a housing for the screw, and a shaft therefor, means for supporting said shaft rotatably, an auxiliary engine for starting and continuing the revolutions of the screw and allowing an uncoupling and coupling of its shaft from and with said engine, and a means for allowing the waste water to be exhausted through openings in said hull.

2. In a propelling means for vessels by an Archimedean screw, a hull having a longitudinal channel therein for the reception of said screw and a plurality of side openings, plate elements hinged to the hull for closing the openings in the hull and springs for holding the same normally in closed position, allowing an exhaust of the waste water during the operation of the screw.

Signed at New York, in the county of New York, and White Plains, in the county of Westchester, and State of New York, respectively, this 8th day of June, A. D. 1927.

JOHN BOLGIANO.
WILLIAM REILLY.